June 22, 1948.  A. L. HOPPER  2,443,619
PULSE GENERATOR OF THE SHOCK-EXCITED TYPE
Filed Feb. 8, 1945

INVENTOR
A. L. HOPPER
BY H. O. Wright
ATTORNEY

Patented June 22, 1948

2,443,619

UNITED STATES PATENT OFFICE 2,443,619

PULSE GENERATOR OF THE SHOCK-EXCITED TYPE

Andrew L. Hopper, River Edge, N. J., assignor to Bell Telephone Laboratories, Incorporated, New York, N. Y., a corporation of New York Application February 8, 1945, Serial No. 576,836

2 Claims. (Cl. 250—36)

This invention relates to improved pulse generating circuits of a type particularly well adapted to provide a substantially undistorted, accurately timed, series of pulses for use in range marker pulse generating circuits for radar systems and for similar purposes. More specifically, it relates to pulse generating circuits of the type in which a highly efficient resonant circuit is shock excited into oscillation and the resulting oscillatory wave is then employed to provide the desired series of pulses. The invention resides in particular circuits which maintain the efficiency of the resonant circuit and at the same time eliminate sources of distortion which tend to impair the accuracy of the timing arrangements utilizing the resulting oscillatory wave.

A particular feature and object of the invention is the elimination of distortion resulting from the presence of unwanted alternating current components in rectifying circuits employed to derive pulse series from the oscillatory wave of the resonant circuit.

Other features and objects of the invention will become apparent during the course of the following detailed description of particular illustrative embodiments and from the appended claims.

Figure 1:
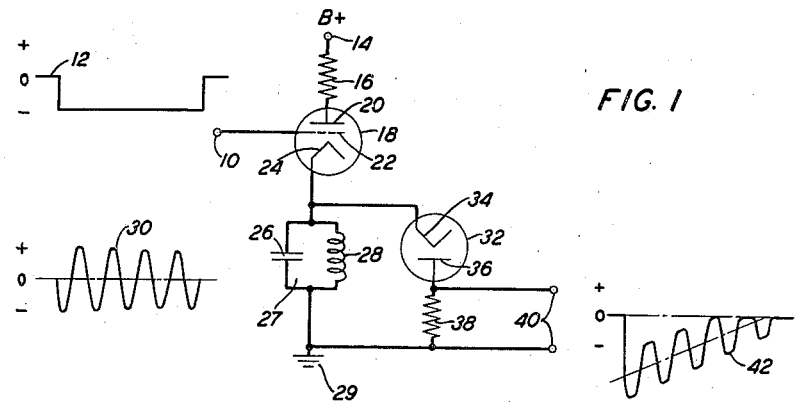
Figure 2:
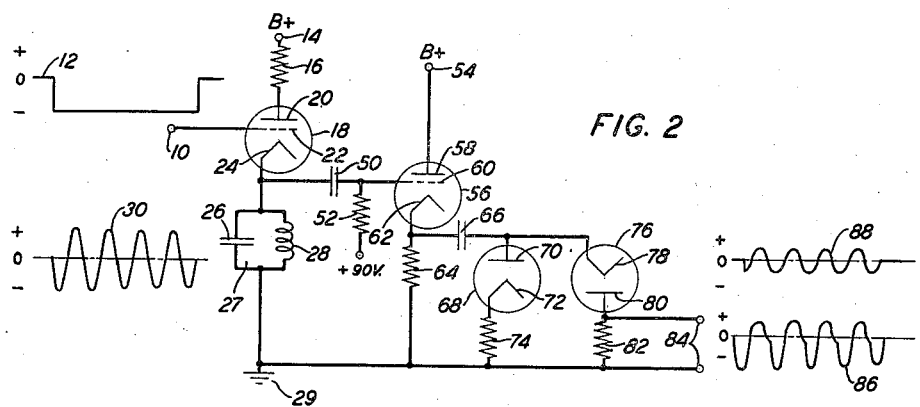
Figure 3:
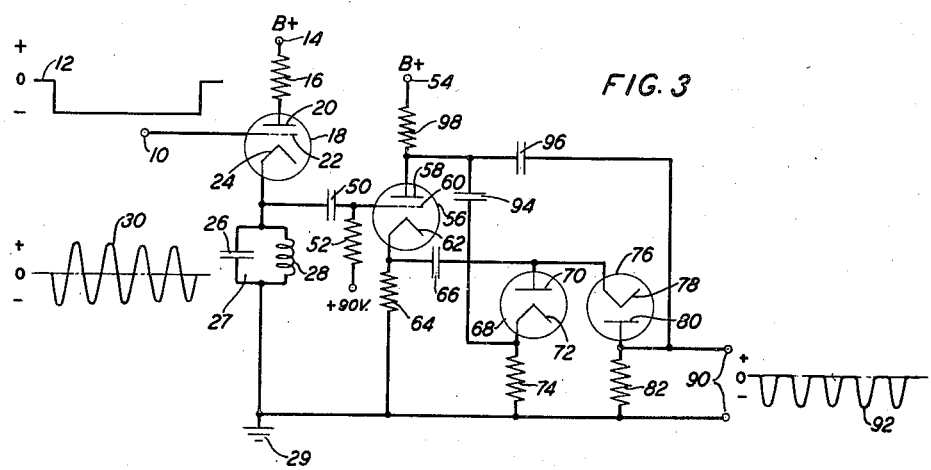

In the accompanying drawing, Figs. 1 and 2 illustrate in electrical schematic diagram form, accompanied by suitable illustrative wave and pulse forms, prior art pulse generating circuits of the general type over which the circuits of the invention represent improved forms; and Fig. 3 represents in electrical schematic diagram form, accompanied by suitable illustrative wave and pulse forms, a specific circuit illustrating an application of the principles of the invention.

Figs. 2 and 3 represent steps in the development of an improved circuit of the invention (shown in Fig. 3) from a conventional circuit represented by Fig. 1. Like elements of the several circuits bear like numerical designations in all figures.

In more detail, in Fig. 1, the circuit including a vacuum tube 18 has, connected between the cathode 24 and ground 29, a highly efficient resonant circuit 27 comprising capacitor 26 and inductance 28 connected in parallel, as shown. Elements 26 and 28, preferably, are as nearly non-dissipative as it is practicable to make them. The anode 20 of vacuum tube 18 is connected through resistance 16 to terminal 14 which, for normal operation, is connected to the positive terminal of a suitable "B" or anode voltage supply, which can, in a typical case, be a 300-volt battery or equivalent conventional direct current source.

The control electrode or grid 22 of tube 18 is connected to terminal 10 which in turn, for normal operation, is connected to a suitable source providing control pulses, such as that illustrated by pulse 12, positioned above terminal 10. Numerous forms of multivibrators and other pulsing circuits are, of course, well known in the art which will provide pulses of this character.

In the absence of a control pulse the normal operating voltages of the circuit just described are such that an appreciable anode-cathode current flows through tube 18 and resonant circuit 27, the latter being thus charged with an appreciable quantity of electrical energy.

Upon the arrival of the control pulse 12, the control grid 22 of vacuum tube 18 is suddenly driven sufficiently negative to cut-off tube 18 thus shock exciting resonant circuit 27 whereupon it oscillates producing an oscillatory sine wave illustrated by wave 30 to the left of circuit 27. At the end of the control pulse 12, tube 18 again becomes conductive and the oscillation of circuit 27 is quenched and the circuit 27 is again charged with electrical energy and in readiness to repeat the above-described operation.

In accord with conventional practice, Fig. 1 further shows a diode vacuum tube rectifier 32 and a resistor 38, which for convenience will be termed the load resistor, connected in series, the combination being connected in shunt across resonant circuit 27, as shown. In order to avoid seriously impairing the effective electrical efficiency of resonant circuit 27 by this last stated shunting circuit, it is necessary to make the load resistor 38 large. This in turn, results in a large time constant for the combination of resistor 38 and the distributed capacity of the circuit with which it is associated and the distorted wave shape 42 is obtained at terminals 40 which connect to the upper and lower ends of load resistor 38.

A smaller load resistor can be employed, however, by use of the well-known expedient of interposing a cathode follower vacuum tube circuit between it and the resonant circuit 27.

Such an arrangement is shown in Fig. 2 where resistor 82 is now the load resistor (i. e., the resistor across which the used wave is developed) and the cathode follower circuit, comprising vacuum tube 58, capacitor 50 and resistors 52 and 54, is interposed between the circuit including load resistor 82 and the resonant circuit 27. Capacitor 50 is, of course, a simple coupling capacitor. Resistor 52 is likewise, a simple coupling resistor and also provides for the application of a suitable bias potential to the control grid 60 of cathode follower tube 56. In a typical case, assuming the +B voltage (or bias) applied to the anode 58 of tube 56 to be in the neighborhood of +300 volts, a grid bias voltage of +90 volts on resistor 52 as indicated in Fig. 2 is suitable. The negative terminals of both bias voltage sources should, of course, be connected to ground.

Resistor 64 is connected between the cathode 62 of tube 56 and ground, as shown in Fig. 2. As with all conventional cathode follower circuits the input impedance is large so that it does not seriously damp or degrade the resonant circuit 27. Also resistor 64 is relatively small or in other words the cathode circuit impedance is small and hence can readily be matched to the impedance of the circuit including the load resistor 82 and diode rectifier 76. A coupling condenser 66 is employed to effect the desired coupling and a second diode 68 and resistor 74 in series are shunted across diode 76 and load resistor 82, the second diode 68 being poled oppositely from diode 76 and serving to keep the circuit balanced and to prevent a shift in the direct current axis. Expressed in other words, the arrangement can be said to effect the loose coupling of the load circuit to the resonant circuit 27.

The output wave obtained from the circuit of Fig. 2 at terminals 84 connected across load resistor 82 is illustrated by wave 86 to the right of terminals 84. The smaller simple sine wave 88 shown above wave 86 represents an unwanted alternating component of wave 86 which flows through the series combination of diode 76 and resistor 82 because of the inherent capacity between cathode and anode of diode 76. From elementary electrical circuit theory it is apparent that the capacitative component in such a circuit will lead the resistive component. Also experience with conventional commercial forms of diode vacuum tubes has shown that the capacitative component will be of appreciable amplitude. In a typical instance the capacitative component was found to have a peak voltage amplitude of 7 volts where the resistive component had a peak voltage amplitude of 35 volts, the former component leading the latter by approximately 70 degrees. The distortion of the rectified half sine waves introduced by the unwanted alternating current component 88 is apparent in wave 86 of Fig. 2. Not only does the unwanted component produce positive pulses of appreciable amplitude but also it alters the position of the points at which the half sine waves would normally intersect the zero axis. Since these points are usually the critical points in pulse timing systems it is obvious that the accuracy of the timing afforded is seriously impaired.

In accordance with the principles of the present invention, therefore, the circuit of Fig. 2 is modified as shown in Fig. 3. A resistor 98 is added in the anode circuit of cathode follower tube 56 to develop a voltage which, in accordance with the well-known operational characteristics of such tubes, is substantially in phase opposition to the voltage developed in the cathode circuit across resistance 64. Also a condenser 96 is connected between the anode 58 and the upper end of resistor 82. Resistance 98 and condenser 96 are proportioned to add across resistor 82 an alternating sine wave voltage component equal in amplitude and substantially 180 degrees out of phase with the alternating component illustrated by wave 88 of Fig. 2 and discussed above. This, of course, substantially neutralizes or balances out the unwanted component and provides at the output terminals 90 a series of substantially undistorted half sine wave pulses as illustrated by wave 92 to the right of terminals 90.

Condenser 94 represents a further refinement in accordance with the principles of the invention. As shown in Fig. 3 it connects the anode 58 of tube 56 with the upper end of the resistor 74. It is proportioned to provide across resistor 74 an alternating sine wave voltage component of equal amplitude with the alternating voltage component across resistor 74 and substantially 180 degrees out of phase with it so as to neutralize it and improve the balance of the circuit afforded by the addition of the combination of tube 68 and resistor 74 as mentioned above. It should be understood, however, that condenser 94 can be omitted in cases where minor distortion of the output wave 92 is of no appreciable moment.

Numerous modifications of the above-described illustrative embodiments of the principles of the invention can obviously be readily devised by those skilled in the art without departing from the spirit and scope thereof. The scope of the invention is defined in the following claims.

What is claimed is:

1. Means for generating a series of accurately timed, evenly spaced electrical pulses comprising a resonant circuit consisting of an inductance and a capacity connected electrically in parallel, means for shock exciting said circuit into sine-wave oscillation, a vacuum tube rectifier having at least an anode and a cathode, a resistance element connected electrically in series with said rectifier, means for loosely coupling said series-connected rectifier and resistance with said resonant circuit, means for neutralizing the unwanted alternating current component of the total current flowing through said resistor, said last stated means comprising means for developing a voltage of identical frequency and amplitude with that developed across said resistor by the unwanted alternating current and a circut introducing said developed voltage across said resistor in phase opposition to that developed across said resistor by the unwanted alternating current and a second vacuum tube rectifier and a second resistance element, said second rectifier and second resistance element being connected electrically in series, said series-connected second rectifier and resistance being connected electrically in shunt with the first stated series-connected rectifier, and resistance, said second rectifier being poled to rectify pulses of opposite polarity with respect to those rectified by said first rectifier.

2. A pulse generating circuit comprising a parallel resonant circuit, means for shock exciting said resonant circuit into oscillation, a vacuum tube rectifying circuit including a first resistive element connected electrically in series therewith, a cathode follower vacuum tube circuit cooperatively coupling, through its cathode circuit, said resonant circuit loosely to said rectifying circuit, said cathode follower circuit including a vacuum tube having at least an anode, a cathode and a control element and a neutralizing circuit including a second resistive element in the anode circuit of the vacuum tube of said cathode follower circuit and a capacity electrically connected between the anode of said cathode follower tube and the junction of said rectifying vacuum tube and the said first resistive element whereby alternating current passing through said rectifying tube is neutralized in said first resistive element and distortion of pulse voltages appearing across said first resistive element is eliminated.

ANDREW L. HOPPER.

REFERENCES CITED

The following references are of record in the file of this patent:

UNITED STATES PATENTS

| Number | Name | Date |
|---|---|---|
| 2,146,078 | Ziegler | Feb. 18, 1947 |
| 2,153,202 | Nichols | Apr. 4, 1939 |
| 2,194,499 | Gelzer | Mar. 26, 1940 |
| 2,266,668 | Tubbs | Dec. 16, 1941 |
| 2,288,554 | Smith | June 30, 1942 |
| 2,408,061 | Grieg | Sept. 24, 1946 |
| 2,414,479 | Miller | Jan. 21, 1947 |
| 2,415,093 | Gerwin | Feb. 4, 1947 |

OTHER REFERENCES

Proc. of I. R. E., vol. 28, No. 9, September 1940, pp. 406–409, "Generation of Synchronizing Pulses by Impulse Excitation," by Sherman. (Copy in Division 51.)